April 18, 1967  E. H. REHNBORG ETAL  3,314,726
WHEEL BALANCE CORRECTION DEVICE
Original Filed July 16, 1959  2 Sheets-Sheet 1

INVENTORS.
JOHN C. WILBORN
AND
EDWARD H. REHNBORG
BY Hiram A. Sturgis
Agent

April 18, 1967  E. H. REHNBORG ETAL  3,314,726
WHEEL BALANCE CORRECTION DEVICE
Original Filed July 16, 1959  2 Sheets-Sheet 2

INVENTORS.
JOHN C. WILBORN
AND
EDWARD H. REHNBORG
BY Hiram A. Sturges
agent

United States Patent Office 3,314,726
Patented Apr. 18, 1967

3,314,726
WHEEL BALANCE CORRECTION DEVICE
Edward H. Rehnborg, Pasadena, Calif., and John C. Wilborn, 4559 C. Windsor Mall, Oklahoma City, Okla. 73127; said Rehnborg assignor to said Wilborn
Continuation of application Ser. No. 827,525, July 16, 1959. This application Sept. 10, 1964, Ser. No. 406,654
2 Claims. (Cl. 301—5)

This application is a continuation of a co-pending prior application, Ser. No. 827,525, filed July 16, 1959, now abandoned.

This invention relates to the balancing of rotating members, particularly wheels of vehicles, and more particularly it is an object of this invention to provide means for more effectively balancing the many forces causing unbalance in wheels than has heretofore been possible.

Heretofore wheel balancing has been done by weight means movable in a circular vertical channel in vehicle wheels but in all cases only one such channel was employed, it being thought that that was all that was needed.

We have made a scientific, physical and mathematical study with calculations that prove the need for preferably three such channels per wheel.

A further object of our invention is to provide in a vehicle wheel provision of one channel in the center of the wheel arranged in a vertical circle disposed in the deeper part of the rim well, used in combination with one or more other channel's arranged on the side or sides of the rim spaced horizontally from the center channel as much as the rim allows.

It is our belief that the multiple channels would help correct the vertical imbalance as well as counteract the shimmy and side imbalance caused by numerous factors and even tend to counteract the problems created by out-of-line wheels and tires as well as gouges in the sides of the tires.

We prefer in general that the channels be at maximum diameter as practical for maximum balancing effect.

It is our belief that imbalance is not necessarily due to the tire wheel, but can also be due to the suspension system, springs, shock absorbers, misalignment, off-center tires, bent tires and out-of-round tires.

Other undeterminable factors are involved in wheels of other certain mechanical mechanisms and our invention is not limited to vehicle tires.

A further object is to provide special clips for holding tubular channels in place against the underside of the rim of a vehicle wheel, the clips overlapping the top of the rim and extending between the tire and rim slightly.

Still another object is to provide means for fabricating tubular channels including splicing by a sleeve and abutment cementing or fusion in the case of plastic material.

Still another object is to provide our new concept of mounting a tubular channel means on the exterior of the brake drum for providing exceptionally concealed channel position and also to place a channel in a triangular relationship as necessary in cross section through a half portion of a wheel, with respect to two other channels, preferably rim-mounted whereby the three channels by their spaced relationships, both vertically and horizontally, tend to give a greater amount of correction against various unbalanced forces.

Still another object is to provide a brake drum channel which makes use of the exterior of the brake drum itself as one of the sides of the channel.

Other and further objects and advantages of the present invention will be apparent from the following detailed description, drawings, and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

Figure 2:
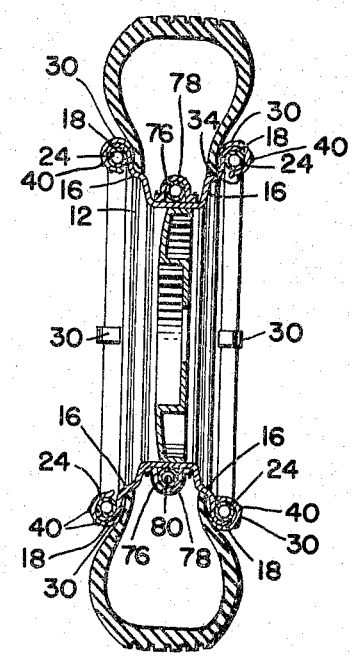
FIG. 2 is a view-in-section taken along the line 2—2 of FIG. 1.
Figure 6:
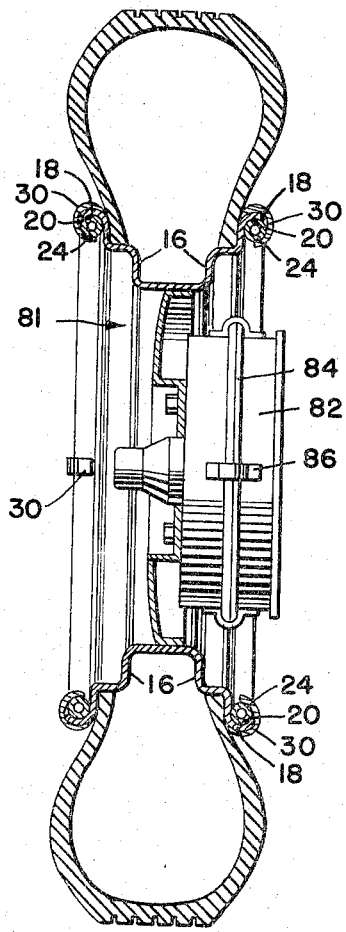
Figure 7:
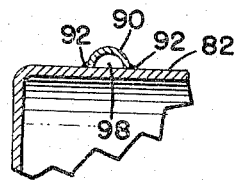

FIG. 6 is a cross-sectional view taken vertically through a wheel and in that way is similar to FIG. 2, excepting that it shows a further modification in which an innermost tube is mounted on the brake drum; and FIGURE 7 is a detail showing a cross-section of a small part of the exterior of a brake drum showing a modification of a weight channel forming means using the brake drum as part of its wall.

Figure 1:
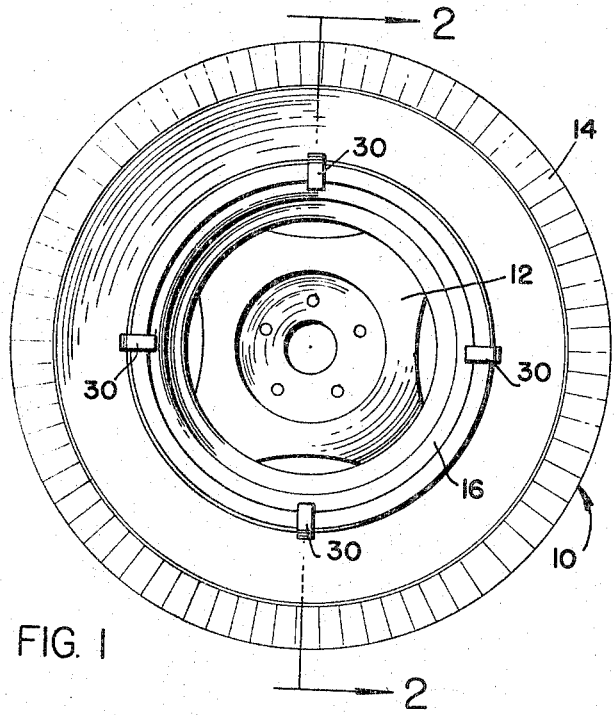
FIG. 1 is a side elevation of a vehicle wheel with tire carrying one modification of a weight imbalance correction means of this invention.

In the drawing, FIG. 1 is a side elevation of a vehicle wheel 10 including rim 12 and tire 14.

As best seen in FIG. 2, the rim 12 has annular flanges 16 at the sides thereof, the flanges 16 each terminating in an annular portion 18 having a concave under-surface 20 facing generally downwardly and outwardly.

A vertically disposed circular tubular member 24 having an exterior surface convex on a portion of its side, and preferably circular in cross-section is juxtaposed with respect to the concave surface 20 of the rim 12 and is substantially nested in the concave surface 20.

Figure 3:
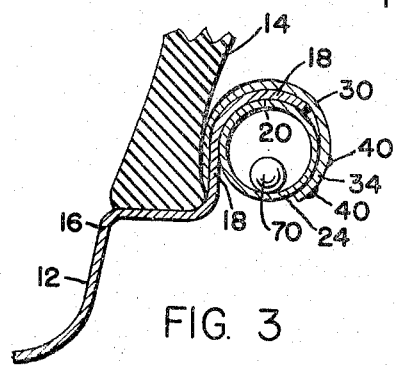
FIG. 3 is a cross-sectional view taken vertically through a portion of the outer edge of the rim of the wheel of FIG. 2.

We provide clips 30 for securing the tubular member 24 to the rim to hold each tube 24 firmly in place. The clips 30 are each preferably of substantially U-shape in cross-section, as best seen in FIG. 3, and are provided with an outer end portion 34 which is inturned in an arc conforming to the exterior surface of the tubular member 24. Each clip extends from its outer and upward end over the annular portion 18 of the rim 12 and downwardly on the inner side of the annular portion 18 between the tire 14 and the annular portion of the rim 18.

Such a construction will hold the tube 24 in place by itself. However, we further prefer that suitable means be provided as indicated at 40 for attaching each clip 30 to the respective tube 24. The means 40 could be welding or plastic fusion when plastic is used.

A plurality of the clips 30 are used around each tube 24 at spaced apart points as shown.

Figure 4:
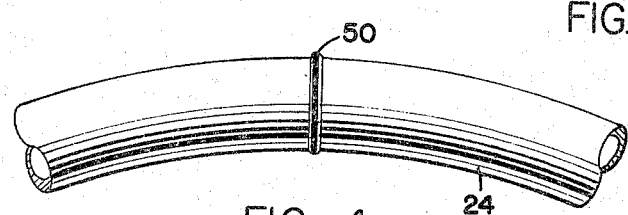
FIG. 4 is a weight imbalance correction tube with ends secured together.
Figure 5:
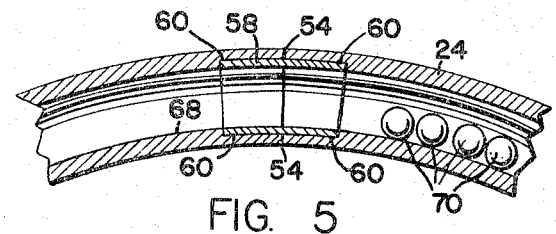
FIG. 5 shows a weight imbalance correction tube with the ends secured together in a different modified manner.

Referring to FIGURES 4 and 5 it will be seen that the tubes 24 can be continuous to be secured together at the ends by plastic fusion or by welding, both of which are indicated at 50, and depending upon the material employed, the ends of the tube being abutted and then welded or fused.

In FIG. 5 another way is shown in which the ends of the tube are abutted as seen at 54 but in which a sleeve 58 is disposed overlapping the abutted ends of the tube and is inset into annular grooves 60 in each end of the tube, the interior of the sleeve 58 being flush with the interior 68 of the tube 24 to permit free-rolling of counter-balancing weight means such as sperical tubular weights 70, shown in FIG. 5. The outside diameter of the spherical weights 70 is less than the inside diameter of the tubes 24 so that the weights are free to travel in the tubes.

The spherical weights 70 are also in all other weight channels or interiors of the other tubes 24.

It will be understood that any suitable weight means whatsoever that will gain the end of correcting wheel imbalances in a substantial manner can be used and the scope of our invention is not to be interpreted as limited by any one weight means.

Referring now to FIG. 2, it will be seen that in addition to the weight tubes 24 on the inner and outer extremities of the rim 12 we prefer to have still another imbalance correction tube 76 disposed about the deepest part of the well on the exterior of the rim 12 and the tube 76 can be juxtaposed with respect to the rim at that point being held in place by substantially U-shaped holders 78 which latter are suitably fixed to the rim.

It will be seen that the tube 78 is spaced both vertically and horizontally from the tubes 24 and this is of advantage in correcting a maximum of imbalancing forces in a practical manner.

Suitable weight means 70 such as weight balances are disposed also in the tube 76 or other weight means similar to that described in the tube 24.

It will be seen that the various modifications of this invention all involve the attachment of a rolling weight tube to an automotive wheel rim 12 of the kind adapted to receive thereagainst a tire 14 of approximately U-shaped cross section.

Referring to FIG. 6 we find there illustrated a wheel 81 having a brake drum 82 attached thereto. An imbalance correcting tube 84 is disposed around the exterior of the drum 82 and is attached thereto by suitable holders 86. It will be understood that the tube 84 can contain weight means similar to the tubes 24 and that its mounting on the brake drum gives a variety of vertical positions for counteracting imbalance forces.

Referring to FIG. 7 a modification is there shown in which the brake drum 82 has semi-circular member 90 mounted thereon and welded thereto at its lower edges at 92, the member 90 having its concave interior surface facing the drum 82 so that the exterior of the drum forms a portion of the wall of a weight channel 98 formed inside the member 90, which latter is to receive weight means similar to the tubes 24.

As best seen in FIGURE 3, the tube 20 is received against the side of the rim 12, each clip 30 provides a means attached to the tube 20 and extendable across overlapping and in engagement with that side of the rim flange 18 which is disposed away from the axis of the rim 12.

The clips 30 form a securing means, the terminal ends 100 of which are disposed spaced from the inner side of the tube 20 to receive the rim 18 therebetween, the terminal end portions of the securing member 30 being disposable between the rim 12 and the tire 14 for securing the tube to the tire.

As thus described it is believed clear that the objectives hereinabove set forth are made possible by the several features herein shown.

From the foregoing description, it is thought to be obvious that a wheel balance correction device constructed in accordance with our invention is particularly well adapted for use, by reason of the convenience and facility with which it may be assembled and operated, and it will also be obvious that our invention is susceptible of some change and modification without departing from the principles and spirit thereof, and for this reason we do not wish to be understood as limiting ourselves to the precise arrangement and formation of the several parts herein shown in carrying out our invention in practice, except as claimed.

We claim:

1. A wheel and wheel balancer assembly comprising an automobile wheel having an axis of rotation, said wheel having right and left hand sides spaced along said axis, said wheel having a rim having a central portion, said rim having right and left side flanges having inner ends attached to each side of said central portion and extending away from said axis, said flanges having outermost terminal each edges of which are outturned transversely to the remainder of the respective flange, said outermost edges having arcuate annular surfaces on sides thereof adjacent said axis, right and left circular endless tubes nested in the spaces adjacent to said arcuate annular surfaces and centered on said axis and each disposed at a right angle to said axis, means engaging said tubes and attaching said tubes to said rim, a circular center tube parallel to said right and left tube and secured to the outer surface of the central portion of said rim, and spherical weights in said tubes, said weights each having a diameter less than the inside diameter of the respective tube.

2. A wheel and wheel balancer assembly comprising an automobile wheel having an axis of rotation, said wheel having right and left hand sides spaced along said axis, said wheel having a central portion, said rim having right and left side flanges having inner ends attached to each side of said central portion and extending away from said axis, said flanges having outermost terminal edges each of which are outturned transversely to the remainder of the respective flange, said outermost edges having arcuate annular surfaces on sides thereof adjacent said axis, right and left circular endless tubes nested in the spaces adjacent to said arcuate annular surfaces and centered on said axis and each disposed at a right angle to said axis, means engaging said tubes and attaching said tubes to said rim, a brake drum mounted on said wheel and having a circular outer surface centered at said axis, a central circular tube parallel to said right and left tubes and secured to said outer surface of said brake drum and centered on said axis, said spherical weights in said tubes, said weights having diameters less than the inside diameters of the respective tubes.

References Cited by the Examiner

UNITED STATES PATENTS

| | | | |
|---|---|---|---|
| 32,100 | 4/1861 | Wyckoff | 285—397 |
| 414,642 | 11/1889 | Herrick. | |
| 1,209,730 | 12/1916 | Leblanc. | |
| 1,314,005 | 8/1919 | Louden. | |
| 2,237,501 | 4/1941 | Purvis | 301—5 |
| 2,687,918 | 8/1954 | Bell et al. | 301—5 |
| 2,737,420 | 3/1956 | Wilborn | 301—5 |
| 2,771,240 | 11/1956 | Gurin. | |
| 2,801,883 | 8/1957 | Householder | 301—5 |
| 3,006,690 | 10/1961 | Pierce | 301—5 |
| 3,077,914 | 2/1963 | Fritts | 301—5 X |
| 3,164,413 | 1/1965 | Salathiel | 301—5 |

FOREIGN PATENTS 832,048   4/1960   Great Britain.

BENJAMIN HERSH, *Primary Examiner.*

R. J. JOHNSON, *Assistant Examiner.*